United States Patent [19]
Claassen et al.

[11] Patent Number: 5,259,859
[45] Date of Patent: Nov. 9, 1993

[54] LIGHTWEIGHT VACUUM SHUTTLE

[75] Inventors: George R. Claassen, New Kensington; James H. Schwartz, Gibsonia; Thomas L. Waterloo, Mercer; Richard V. Posney, Freeport, all of Pa.

[73] Assignee: PPG Industries, Inc., Pittsburgh, Pa.

[21] Appl. No.: 939,325

[22] Filed: Sep. 2, 1992

[51] Int. Cl.⁵ ............................................. C03B 35/14
[52] U.S. Cl. ................................. 65/182.2; 65/289; 65/374.12; 294/64.1
[58] Field of Search ............. 65/182.2, 287, 289, 65/374.12; 294/64.1, 65; 414/627, 752

[56] References Cited

U.S. PATENT DOCUMENTS

| | | | |
|---|---|---|---|
| 3,223,443 | 12/1965 | Misson | 65/182.2 |
| 4,197,977 | 4/1980 | Deminet | 228/106 |
| 4,285,715 | 8/1981 | Frank | 65/106 |
| 4,368,674 | 1/1983 | Wiens et al. | 105/377 |
| 4,526,605 | 7/1985 | Frank et al. | 65/273 |
| 4,544,595 | 10/1985 | Tomason | 428/116 |
| 4,578,103 | 3/1986 | Fackelman | 65/182.2 |
| 4,662,925 | 5/1987 | Thimons et al. | 65/104 |
| 4,666,492 | 5/1987 | Thimons et al. | 65/29 |
| 4,666,493 | 5/1987 | Frank et al. | 65/29 |
| 4,666,496 | 5/1987 | Fecik et al. | 65/273 |
| 4,767,434 | 8/1988 | Schwartz et al. | 65/29 |
| 4,865,639 | 9/1989 | Kudo | 65/287 |
| 4,881,770 | 11/1989 | Marzinotto et al. | 294/64.1 |
| 5,002,599 | 3/1991 | McMaster | 65/182.2 |

FOREIGN PATENT DOCUMENTS

0484238A2  5/1992  European Pat. Off. .

Primary Examiner—Joye L. Woodard
Attorney, Agent, or Firm—Andrew C. Siminerio

[57] ABSTRACT

A lightweight vacuum pickup is constructed using a honeycomb platen as the sheet engaging member of the pickup. The cells of the honeycomb platen are selectively sealed to control the amount of vacuum drawn through the platen. When used to transfer heat softened glass sheets, the lower sheet engaging surface of the platen is sealed with a dense material cloth which restricts airflow therethrough. The cloth includes holes positioned within the periphery of the glass sheet to be engaged by the pickup.

17 Claims, 4 Drawing Sheets

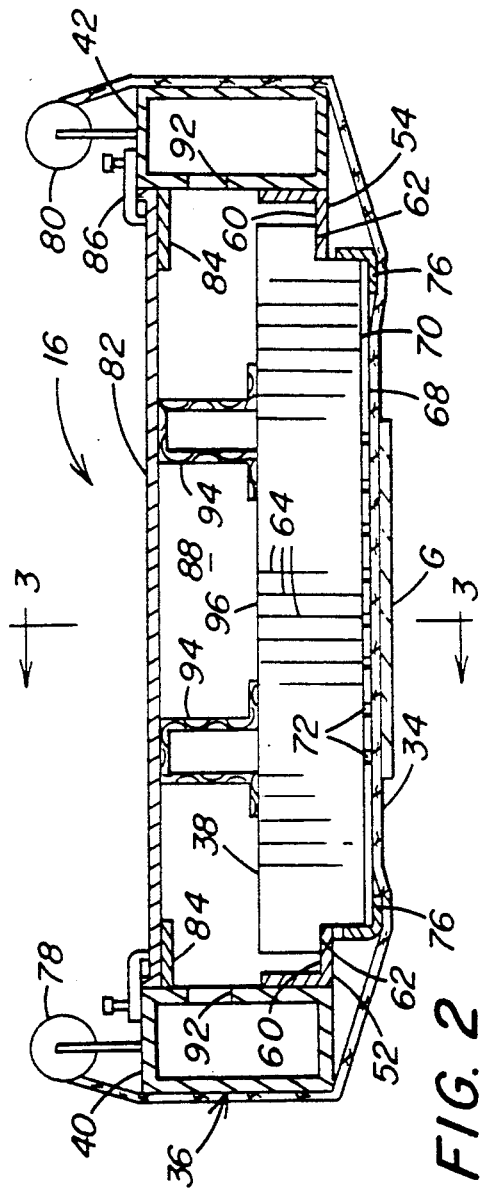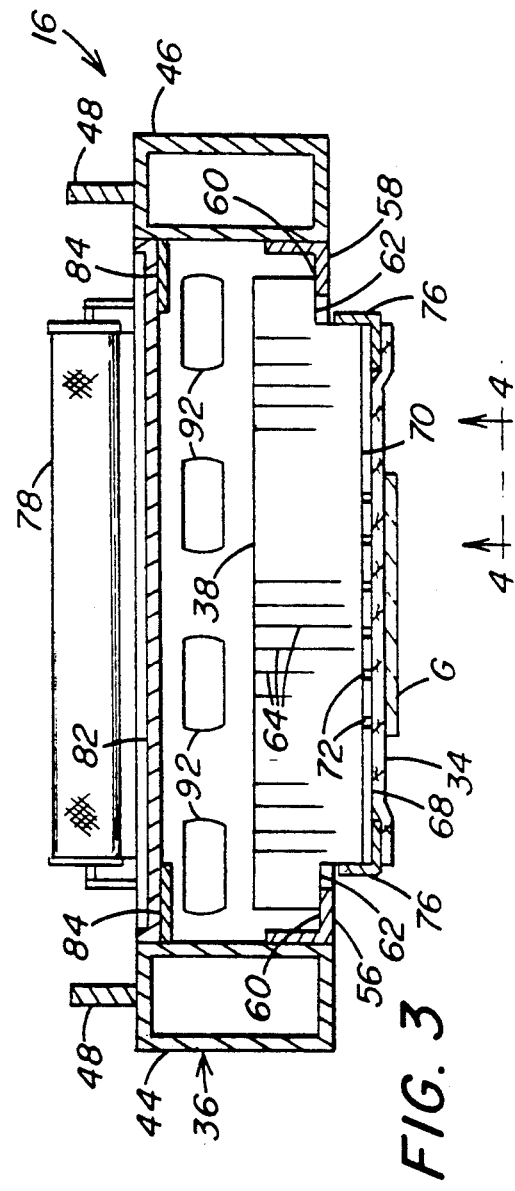

LIGHTWEIGHT VACUUM SHUTTLE

BACKGROUND OF THE INVENTION

This invention relates to transferring sheet material and in particular to a lightweight vacuum pickup for a shuttle system to transfer hot glass sheets from a furnace to a shaping station.

Shaped and tempered glass sheets are widely used as side or rear windows in vehicles such as automobiles and the like. To be suitable for such applications, flat glass sheets must be shaped to precise, defined curvatures dictated by the shape and outline of the frames defined in the window opening. It is also important that the windows meet stringent optical requirements and that the windows be free of optical defects that would tend to interfere with the clear viewing therethrough.

The commercial production of shaped glass sheets for such purposes commonly includes conveying a flat glass sheet along a substantially horizontal path that extends through a tunnel type furnace to heat the sheet to its softening temperature, shaping the heated glass sheet to a desired curvature and cooling the bent glass sheet in a controlled manner to a temperature below the annealing point of the glass. The glass sheet may be lifted off the conveyor surface by suction using a vacuum pickup and transferred to a shaping station where it is deposited between mold surfaces and pressed to shape, as disclosed in U.S. Pat. Nos. 4,662,925 and 4,666,492 to Thimmons et al., 4,666,493 to Frank et al., 4,666,496 to Fecik et al. and 4,767,434 to Schwartz et al.

In this type of shuttling arrangement, the weight of the pickup is of great concern. Generally, a ceramic block is used for the vacuum pickup and, depending on its size, may weigh upwards of 1,000 lbs. (453 kg). This large weight requires large motors to move the pickup at the speeds required to maintain an efficient shaping cycle. In addition, the excessive weight of the pickup adds to the wear and tear on the motor and other components of the shuttle drive arrangement. Also, accurate positioning of the pickup assembly becomes difficult because of its weight.

It would be advantageous to provide a lightweight vacuum shuttle system for use in a horizontal press bending arrangement to transfer glass into a shaping station that may be moved rapidly and positioned accurately.

SUMMARY OF THE INVENTION

The present invention provides a lightweight vacuum pickup constructed using a honeycomb platen as the sheet engaging member of the pickup. The cells of the honeycomb platen extend from an internal vaccum chamber to the lower surface of the platen and are selectively sealed to control the amount of vacuum drawn through the platen. In one particular embodiment of the invention, the lower sheet engaging surface of the platen is sealed with a dense material cloth which restricts airflow therethrough and includes holes positioned within the periphery of the glass sheet to be engaged by the pickup.

BRIEF DESCRIPTION OF THE DRAWINGS

FIG. 2 is a cross-sectional view of the lightweight vacuum pickup along line 2—2 of FIG. 1.

FIG. 3 is a cross section of the pickup along line 3—3 of FIG. 2.

DETAILED DESCRIPTION OF THE INVENTION

The present invention is directed toward a lightweight vacuum pickup for use in transferring heat softened glass sheets but it should be appreciated that the invention may be used to move other types of sheet material in other operations requiring the use of a lightweight shuttle arrangement.

Figure 1:
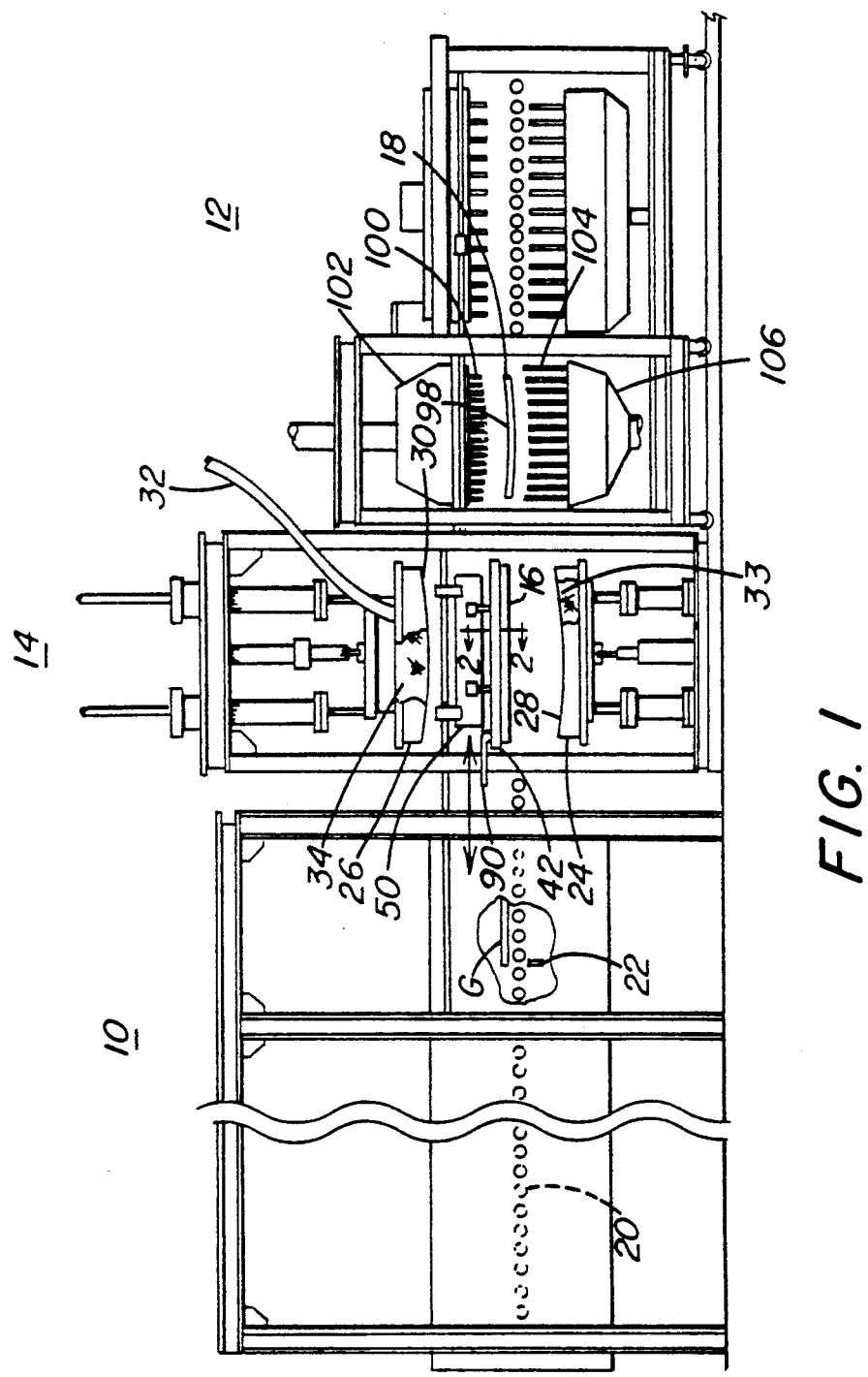
FIG. 1 is a side elevation of a glass sheet heating, shaping and tempering apparatus incorporating features of the present invention.

FIG. 1 illustrates an apparatus for heating and shaping sheets of material similar to that disclosed in U.S. Pat. No. 4,767,434 for shaping glass sheets. Sheets of glass G are conveyed through a furnace 10 and heated to its glass sheet deformation temperature. It should be appreciated that although in the preferred embodiment the sheet material is glass, the invention is not limited to glass and may be used with other heat softenable sheet materials. A cooling station 12 for cooling curved sheets of glass and an unloading station (not shown) located beyond the cooling station 12 are positioned to the right of the furnace 10 as shown in FIG. 1. A shaping station 14 is disclosed between the furnace 10 and cooling station 12. If required, the shaping station 14 may be enclosed and heated. A vacuum pickup assembly 16 transfers heat softened glass sheets G from the furnace 10 to the shaping station 14. A sheet transfer means 18 located in the cooling station 12 transfers shaped glass sheets from the shaping station 14 to the cooling station 12.

Heat may be supplied to the furnace 10 in any convenient manner, for example, from gas burners or electrical radiant heaters or by a combination of both, which heat supply arrangements are well known in the art. The furnace 10 includes a horizontal conveyor comprising longitudinally spaced, transversely extending conveyor rolls 20 that define a path of travel which extends through the furnace 10. The conveyor rolls 20 may be arranged in sections so that the speed of the different conveyor sections may be controlled and synchronized, in a manner well known in the art, for proper movement and positioning of the glass sheets G through the furnace 10. A glass sheet sensing element 22 is located within the furnace 10 as shown in FIG. 1 to initiate a cycle of operation for bending, as will be disclosed later in more detail.

The shaping station 14 includes a lower mold 24 and an upper mold 26 and may be enclosed in a heated cavity (not shown) if required. In the particular embodiment of the invention shown in FIG. 1, the lower mold 24 is a full surface mold with an upper pressing face 28 conforming to the final desired shape for the glass sheet to be bent. The upper mold 26 is a full surface vacuum mold with an apertured lower press face 30 which compliments pressing face 28 of lower mold 24 and includes a vacuum chamber (not shown) which communicates through an evacuation pipe 32 with a vacuum source (not shown). The vacuum pipe 32 may also be connected through a suitable valve arrangement to a source of pressurized air (not shown) and the valves for the vacuum and pressure line may be synchronized according to a predetermined timing cycle in a manner well known in the art to secure the glass sheet C against press face 30 and separate the sheet G from face 30 as will be discussed later in more detail. The molds are suitably mounted on supporting frames in the shaping station 14 and moveable relative to each other along guide rods so that a heat softened glass sheet G deposited at shaping station 14 may be shaped between the molds 24 and 26. The surfaces 28 and 30 of lower and upper molds 24 and 26, respectively, are preferably smoothly surfaced to avoid imparting any irregularities in the glass sheet surface and although not limiting in the present invention, are preferably composed of steel or a ceramic composite. These materials provide a smoothly surfaced contour and good durability despite intermittent contact with hot glass which causes rapid cyclic temperature variations over an extended period. B the lower and, upper molds 24 and 26 may be covered with a refractory material 33 and 34, respectively such as fiberglass cloth as is well known in the art.

The pickup assembly 16 transfers heat softened sheet material from the exit end of the furnace 10 to the shaping station 14 and includes a frame 36 to support and move a vacuum platen pickup 38 shown in FIGS. 2 and 3 from a pickup position within the exit end of the furnace 10 to an unload position between the lower mold 24 a-nd upper mold 26 of the shaping station 14.

The frame 36 includes a pair of longitudinally extending support beams 40 and 42 interconnected by cross members 44 and 46. The beams 40 and 42 are hollow to supply vacuum to the pickup 38 and will be discussed later in more detail. Mounting bolts 48 are used to secure the frame 36 to a shuttle support and drive system 50 which may include drive motors, gears, gear racks, guide rails and lifting mechanisms, for example, as disclosed in U.S. Pat. No. 4,767,344, and which is well known in the art.

Referring to FIGS. 2 and 3, angle members 52 and 54 are secured along support beams 40 and 42, respectively, and angle members 56 and 58 are secured to cross members 44 and 46, respectively, to provide a ledge support 60 for the vacuum pickup 38.

Figure 4:
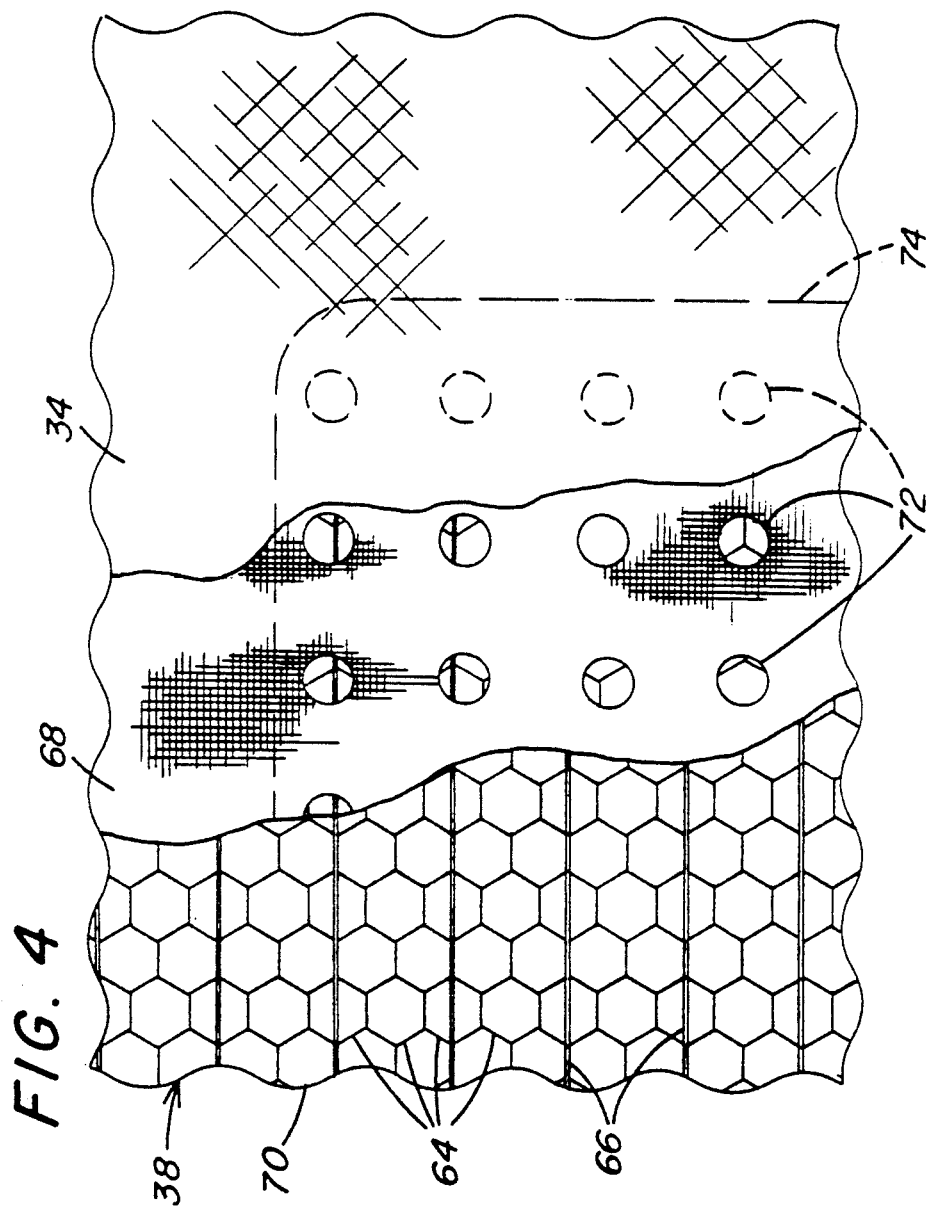
FIG. 4 is a partial bottom view of the pickup taken along line 4—4 of FIG. 3, with portions removed for clarity.

In the present invention, the pickup 38 is a metal honeycomb structure with an outer perimeter ledge 62 which is seated on ledge support 60 so that the pickup 38 is supporting about its periphery. In one particular embodiment of the invention, the honeycomb of the vacuum platen pickup 38 is a 1.75 inch (4.45 cm) thick panel with 0.25 inch (0.64 cm) hexagonal cells 64 constructed from 0.005 inch (0.127 mm) thick 400 series stainless steel, as shown in FIG. 4. Reinforcing ribs 66 are spaced at 0.50 inch (1.27 cm) centers. The depth of the pickup 38 about its perimeter ledge 62 is 1.50 inches (3.81 cm). This particular honeycomb configuration provides an open surface area of approximately 95% which is sealed in a manner discussed below in more detail. A vacuum platen pickup 38 which is 73×33 inches (182.5×82.5 cm) in size and constructed as discussed above would weigh about 93 pounds (42.2 kg). This is approximately 6 to 7 times lighter than an equivalent platen typically constructed from a ceramic material which is 6 inches (15 cm) thick. As a result, less force is required to start and stop the shuttling action of the pickup assembly 16.

It should be appreciated that the honeycomb structure may include other cell configurations, cell sizes and rib configurations and spacings. In addition, other materials may be used, provided they afford the necessary thermal stability for the pickup. As discussed earlier, the pickup assembly 16 cycles from a position at the exit end of the furnace 10 to a position between the shaping molds in the shaping station 14 and is typically exposed to temperatures in the range of 1000°–1200° F. (538°–649° C.).

A heavy, dense cloth 68 is secured to lower face 70 of the honeycomb pickup 38 to restrict air flow and seal the bottom of the pickup assembly 16. With the honeycomb structure discussed above, 0.125 inch (0.32 cm) thick Z5-C coated cloth from Pyrotek, Inc., Pennsylvania, may be used. This material provides a tight weave which resists air flow through the honeycomb structure. To provide for sufficient air flow through the cloth 68 to lift a glass sheet G and secure it against lower face 70 of the pickup 38 without using excessively high vacuum levels, holes 72 are punched through the cloth 68 as shown in FIG. 4. It should be appreciated that the number, size and spacing of the holes 72 is dependent upon several interrelated factors including the vacuum level, size and thickness of the glass sheet and the distance between the glass sheet G and lower face 70 of the pickup 38. It should further be appreciated that if the vacuum level is too high, the force resulting from the glass sheet G impacting lower face 70 as well as the force on the sheet G due to the vacuum could result in glass sheet marking. In the embodiment of the invention discussed above, with a vacuum of 6 inches (15.24 cm) of water for lifting and securing 4 millimeter thick glass a distance of 0.125 inches (0.32 cm) from the glass sheet G to the pickup 38, it was found that 0.188 inch (0.48 cm) diameter holes punched through the cloth 68 at 2 inch (5.08 cm) centers within the perimeter of the glass sheet G to be lifted (indicated by dotted line 74 in FIG. 4) provided the necessary vacuum along face 70 to operate effectively. Although not limiting in the present invention, is the preferred embodiment, holes 72 are limited to locations within the perimeter of the glass sheet G. This will reduce air flow through pickup 38 at the edge of the sheet C which may otherwise cool the edge and adversely effect the shaping operation.

The cloth 68 is secured to the honeycomb pickup 38 in a convenient manner. In the particular embodiment illustrated in FIGS. 2 and 3, angle members 76 are secured about the periphery of the pickup 38 by bolts (not shown) extending through the honeycomb platen. The horizontal legs of member 76 seal a portion of the lower face 70 as well as hold the cloth 68 in place. The vertical legs of member 76 seal the cells 64 about the periphery of the pickup 38 to prevent any additional vacuum leakage.

It should be appreciated that other arrangements and/or materials may be used to seal the lower surface 70 of the pickup 38, provided that such material can survive the high temperature and repeated thermal cyclings of the pickup operation. For example, it is believed that other cloths which restrict about 80% or more of the air flow therethrough would also provide the required sealing of the cells 64. A more open weave which provides less air restriction may also be used but this may require a higher vacuum level in the pickup 38 which may mark the heat softened sheet G when lifted and secured to the pickup 38. In addition, if there is excessive air flow through cloth 68 outside the periphery of sheet G and the shaping station 14 is not enclosed and heated, this flow may cool the sheet's edge prior to bending and adversely effect the shaping operation. Sheet metal may also be used to seal selected portions of the pickup and may be used in combination with the heavy cloth of a type discussed earlier. In this latter arrangement, the sheet metal seals the peripheral area of the pickup 38 while the cloth with the required holes selectively seals the center area where the glass sheet G is engaged by the pickup. As another alternative, the perforated cloth 68 may be replaced with perforated sheet metal.

As discussed earlier, a fiberglass cloth 34 is used to cover the sheet engaging face 70 of the pickup 38. As illustrated in FIGS. 2 and 3, the cloth 34 may be supplied by rolls 78 and 80 positioned on support beams 40 and 42, in a manner well known in the art.

A lid member 82 rests on plates 84 which are positioned on beams 40, 42, 44, and 46 and is secured to the upper side of the pickup assembly 16 by clamps 86 to seal the top of pickup assembly 16 and form a vacuum chamber 88. If desired, refractory material, for example, Fiberfrax® paper available from Carborundum Co., N.Y., may be used about the periphery of the lid 82 to provide a better seal.

Although not required, in the particular embodiment of the invention shown in FIGS. 2 and 3, vacuum is supplied to the vacuum chamber 88 of the pickup assembly 16 through support beams 40 and 42. More specifically, vacuum hookups 90 (one shown in FIG. 1 only) are connected to one or both of the hollow beams 40 and 42 which include slots 92 which in turn interconnect the vacuum source with the lower face 70 of the honeycomb pickup 38 via the vacuum chamber 88 and cells 64.

When vacuum is drawn through the pickup assembly 16, the platen 38 may deflect upward, deforming the pickup surface 70. To prevent this occurrence, spacers 94 are positioned within vacuum chamber 88 between lid 82 and upper surface 96 of the platen pickup 38. In one particular embodiment of the invention, the spacers 94 are shaped sections of expanded metal. Because of the open construction of expanded metal, the spacers 94 will not interfere with the vacuum being drawn within the vacuum chamber 88. If desired, tie bars (not shown) may extend through vacuum chamber 88 between support beams 40 and 42 to reinforce the frame 36. With this type of arrangement, spacers 94 would preferably be sized to fit between the tie bars and upper surface 96 of the honeycomb platen 38.

Referring to FIG. 1, the sheet transfer means 18 at the cooling station 12 includes a ring member 98 similar to that disclosed in U.S. Pat. No. 4,285,715. The ring member 98 includes a support rail that is disposed edgewise with its edge forming the support surface of the member 98. The rail follows the contours of the shaped glass sheet G and is spaced slightly inward of the glass sheet perimeter. The glass sheet supporting surface of the rail is preferably a non-metallic material that can support the hot glass sheet without leaving a mark on the glass sheet surface. The ring member 98 is mounted on a carriage (not shown) which moves the member 98 from an upstream position where the member 98 is positioned in the shaping station 14 beneath the upper vacuum mold 26 to a downstream position where the member 98 is positioned between quench nozzles in the cooling station 12.

The cooling station 12, which may be similar to that taught in U.S. Pat. No. 4,285,715, includes longitudinally spaced, transversely extending rows of spaced nozzles 100 extending downward from an upper platen 102 as shown in FIG. 1. In an opposing position to the nozzles 100 are longitudinally spaced, transversely extending rows of nozzles 104 on lower platen 106. The lower ends of the rows of nozzles 100 are located along a curved surface complimenting the curved shape of the upper ends of the rows of nozzles 104 and vertically spaced thereabove to provide a curved clearance space conforming to the transverse shape of the glass sheet G as it is supported on ring member 98 and conveyed therebetween.

Figure 3A:
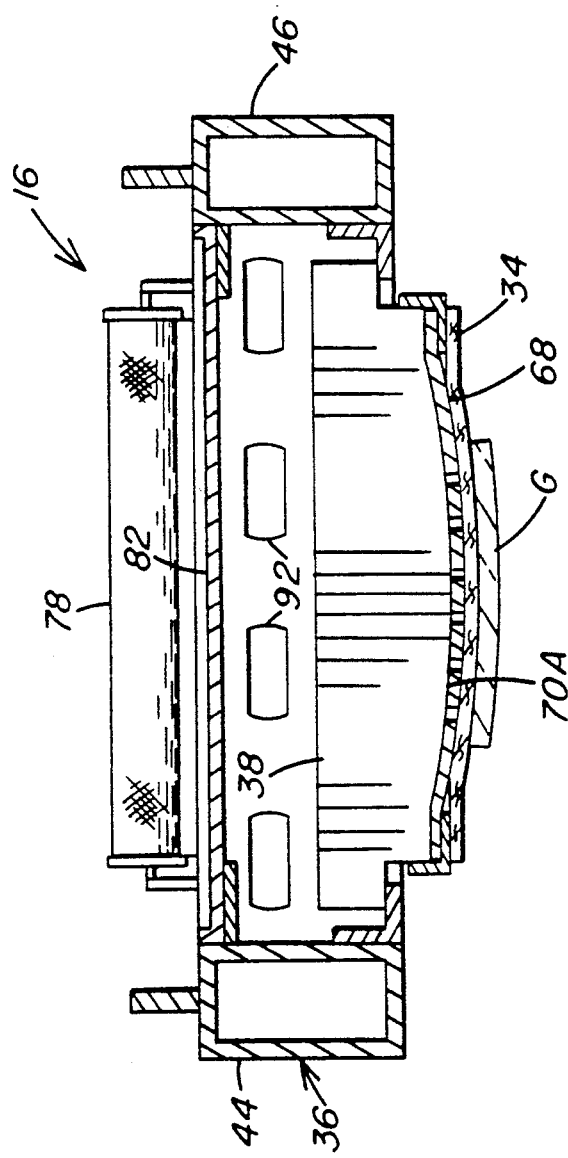
FIG. 3A is a cross-sectional view similar to FIG. 3 illustrating an alternate embodiment of the invention.

In operation, a glass sheet G is conveyed through furnace 10 and heated to its heat softening temperature. As the glass sheet G passes sensor element 22, the transfer and shaping cycle is initiated. When the glass sheet G is positioned below the pickup assembly 16 at the exit end of the furnace 10, vacuum is drawn through the pickup 38 and the glass sheet G is lifted into engagement with lower face 70 of the pickup 38. If desired, lower face 70a may be nonplanar as shown in FIG. 3A. Once the glass sheet is secured against face 70, the pickup assembly 16 moves downstream from the furnace 10 to a position between the lower mold 24 and upper mold 26 in the shaping station 14. It should be appreciated that the movement of the pickup assembly 16 in a downstream direction from the furnace 10 to the shaping station 14 may be synchronized with the downstream movement of the glass sheet G through the furnace 10 so that as the vacuum platen pickup 38 draws a vacuum to lift and engage the glass sheet G there is no relative downstream movement therebetween, as disclosed in U.S. Pat. No. 4,767,434. When properly positioned within shaping station 14, the vacuum in the pickup assembly 16 is terminated and the heat softened glass sheet is deposited on the lower mold 24. If desired, a positive pressure may be introduced into the vacuum chamber 88 of the pickup assembly 16 to more positively separate the heat softened glass sheet from the pickup face 70. The pickup assembly 16 then moves upstream back into the furnace 10 to await the next glass sheet G as the molds 24 and 26 move relative to each other to shape the glass sheet therebetween. Vacuum is drawn through the upper mold 26 to help shape the glass sheet. As the mold separates, the vacuum drawn through the upper mold 26 is maintained to hold the glass sheet G against press face 30. Ring member 98 then moves upstream to a position beneath the upper mold 26 to receive the shaped glass sheet G. Vacuum is terminated in the upper mold 26 and the glass sheet G is deposited on the rail of ring member 98 which then proceeds downstream into the cooling station 12 to controllably cool the shaped glass sheet. If desired, air positive pressure may be applied through upper mold 26 to more positively separate the shaped glass sheet from press face 30.

Due to its low thermal mass, the honeycomb platen pickup 38 will not act as a heat sink and will not draw any significant amount of heat out from the glass sheet G when they are in intimate contact during the sheet transfer from furnace 10 to shaping station 14. It should be appreciated that if an excessive amount of heat is removed from the glass sheet G during this transfer, the shaping operation may be adversely affected. More particularly, there may be incomplete bending in sharply bend areas or surface venting, which will show up after quenching as defects or breakage. To correct this situation, the glass sheet G may be overheated in the furnace 10 to account for any subsequent heat loss due to the sheet transfer; however, this in turn may induce additional defects in the glass sheet such as roll ripple. The use of the honeycomb platen pickup 38 as disclosed herein minimizes any heat loss from the glass sheet G resulting from the sheet contacting the pickup 38 during transfer to the shaping station 14 as well as provide a lightweight transfer arrangement.

The form of the invention shown and described in this disclosure represents an illustrative preferred embodiment thereof. It is understood that the invention is defined in the claimed subject matter which follows and various modifications thereof which become obvious in light of the reading of the description are incorporated therein.

We claim:

1. A vacuum pickup for lifting sheet material comprising:
   an upper member;
   wall members; and
   a lower, lightweight honeycomb platen, wherein said upper member, wall members and platen form a vacuum chamber, and further wherein said platen includes cells extending from said chamber to a lower sheet engaging surface of said platen.

2. The vacuum pickup as in claim 1 further including means to restrict air flow through selected cells of said platen.

3. The vacuum pickup as in claim 2 wherein said engaging surface of said honeycomb platen is nonplanar.

4. The vacuum pickup as in claim 2 wherein said selected cells are located around the peripheral area of said lower sheet engaging surface of said platen so as to be outside a lifted sheet's periphery.

5. The vacuum pickup as in claim 4 wherein said restricting means includes an air impervious material secured to said engaging surface of said platen.

6. The vacuum pickup as in claim 5 further including a perforated member secured to a central area of said engaging surface of said platen surrounded by said peripheral area.

7. The vacuum pickup as in claim 4 wherein said restricting means includes a cloth of sufficient density to restrict airflow therethrough secured to said engaging surface of said platen.

8. The vacuum pickup as in claim 7 further including a cover member extending over said restricting means.

9. The vacuum pickup as in claim 7 wherein said honeycomb platen is constructed of stainless steel and said cloth is a heat resistant material.

10. The pickup as in claim 7 wherein said cloth is secured to said engaging surface and includes a plurality of holes therethrough, said holes being located within a central area of said engaging surface of said platen surrounded by said peripheral area.

11. The vacuum pickup as in claim 2 wherein said wall members include inwardly extending peripheral support ledges and said honeycomb platen includes outwardly extending peripheral ledges overlapping and resting on said inwardly extending ledges.

12. The vacuum pickup as in claim 11 further including a pickup support frame having enclosed vacuum passageways, means to connect said passageways to said vacuum chamber and means to permit connection of said passageways to a vacuum source.

13. The vacuum pickup as in claim 12 further including means to move said support frame and vacuum pickup between different positions.

14. The vacuum pickup as in claim 12 wherein said selected cells are located around the peripheral area of said lower sheet engaging surface of said platen so as to be outside a lifted sheet's periphery.

15. The vacuum pickup as in claim 14 wherein said restricting means includes a cloth of sufficient density to restrict airflow therethrough secured to said engaging surface of said platen.

16. The vacuum pickup as in claim 15 wherein said cloth is secured to said engaging surface and includes a plurality of holes therethrough, said holes being located within a central area of said engaging surface of said platen surrounded by said peripheral area.

17. The pickup as in claim 2 further including means to connect said vacuum chamber to a vacuum source.

* * * * *